United States Patent
Lee et al.

(10) Patent No.: US 8,547,838 B2
(45) Date of Patent: Oct. 1, 2013

(54) BUFFER STATUS REPORTING METHODS FOR MACHINE TYPE COMMUNICATION DATA TRANSMISSION AND RELATED MOBILE COMMUNICATION DEVICES

(75) Inventors: Anthony Lee, San Diego, CA (US); Guotong Wang, Beijing (CN)

(73) Assignee: Via Telecom, Inc., San Diego, CA (US)

( * ) Notice: Subject to any disclaimer, the term of this patent is extended or adjusted under 35 U.S.C. 154(b) by 258 days.

(21) Appl. No.: 13/153,160

(22) Filed: Jun. 3, 2011

(65) Prior Publication Data
US 2011/0300858 A1    Dec. 8, 2011

Related U.S. Application Data

(60) Provisional application No. 61/351,095, filed on Jun. 3, 2010.

(51) Int. Cl.
 H04L 1/00    (2006.01)
 H04L 12/26   (2006.01)
 G06F 11/00   (2006.01)

(52) U.S. Cl.
 USPC ........ 370/230; 370/229; 370/230.1; 370/231; 370/235; 370/236; 370/328; 370/329; 370/412; 370/413

(58) Field of Classification Search
 USPC .............. 370/229, 230, 230.1, 231, 235, 236, 370/252, 328, 329, 412, 413
 See application file for complete search history.

(56) References Cited

U.S. PATENT DOCUMENTS

| | | | | |
|---|---|---|---|---|
| 7,706,410 B2 * | 4/2010 | Chun et al. | | 370/474 |
| 8,265,640 B2 * | 9/2012 | Meylan et al. | | 455/450 |
| 2008/0153521 A1 | 6/2008 | Benaouda et al. | | |
| 2009/0318180 A1 * | 12/2009 | Yi et al. | | 455/522 |
| 2010/0246518 A1 * | 9/2010 | Gheorghiu et al. | | 370/329 |
| 2011/0242972 A1 * | 10/2011 | Sebire et al. | | 370/229 |
| 2011/0292873 A1 * | 12/2011 | Guo | | 370/328 |

FOREIGN PATENT DOCUMENTS

CN    101406097    4/2009

OTHER PUBLICATIONS

Machine translation of CN 101406097 (published Apr. 8, 2009).

* cited by examiner

*Primary Examiner* — Olumide T Ajibade Akonai
(74) *Attorney, Agent, or Firm* — McClure, Qualey & Rodack, LLP

(57) ABSTRACT

A mobile communications device with a wireless module and a controller module for performing a buffer status reporting procedure is provided. The wireless module performs wireless transmissions and receptions to and from a cellular station of a service network. The controller module receives machine type communication (MTC) data, determines whether to trigger a buffer status report (BSR) according to a comparison result of the data size of the MTC data and a threshold value when the MTC data arrives at an empty transmission buffer, and if so, transmits the BSR to the cellular station via the wireless module.

18 Claims, 4 Drawing Sheets

BUFFER STATUS REPORTING METHODS FOR MACHINE TYPE COMMUNICATION DATA TRANSMISSION AND RELATED MOBILE COMMUNICATION DEVICES

CROSS REFERENCE TO RELATED APPLICATIONS

This Application claims priority of U.S. Provisional Application No. 61/351,095, filed on Jun. 3, 2010, and the entirety of which is incorporated by reference herein.

BACKGROUND OF THE INVENTION

1. Field of the Invention

The invention generally relates to mobile communication technologies, and more particularly, to buffer status reporting methods for machine type communication data transmission and related mobile communication devices.

2. Description of the Related Art

In a typical mobile communications environment, a user equipment (UE) may communicate voice and/or data signals with one or more service networks via cellular stations (or referred to as evolved Node-Bs (eNBs)) of service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

According to the UE medium access control (MAC) specification, a Buffer Status Report (BSR) provides the serving cellular station with information about the amount of data available for transmission in an uplink (UL) transmission buffer of the UE. There are three types of BSRs, regular BSR, periodic BSR and padding BSR, caused by different triggering events. In current LTE wireless communication system, when a new UL data which is received by upper layers arrives at the transmission buffer and the transmission buffer is empty (i.e. there is no data available for transmission in the transmission buffer), the mobile communications device will trigger a regular BSR to be transmitted to the cellular station of the service network.

Moreover, in current LTE wireless communication system, in addition to normal human-to-human (H2H) communications, machine type communication (MTC) is further provided. MTC is a Machine-to-Machine communication, also referred to as the Internet of Things (TOT), which concept is to connect real world objects to the Internet via the embedded short range mobile transceiver using the radio-frequency identification (RFID) for automatic recognition and information interconnecting and sharing for all of the objects.

For MTC applications, MTC devices usually only transmit small size data, but a large amount of MTC devices causes the small size data accumulated which leads to a large amount of regular BSR may be triggered (and may followed by a scheduling request triggered by the regular BSR) during the transmission of the MTC data, especially for those data which need to be transmitted periodically if current BSR triggering scheme is applied. This may bring an increase in the signaling overhead and decrease the system overall performance since only small size data is required to be transmitted.

BRIEF SUMMARY OF THE INVENTION

Accordingly, embodiments of the invention provide buffer status reporting methods and related mobile communication devices. In one aspect of the invention, a mobile communications device including a wireless module and a controller module is provided. The wireless module performs wireless transmissions and receptions to and from a cellular station of a service network. The controller module receives machine type communication (MTC) data, and determines whether to trigger a buffer status report (BSR) according to a comparison result of the data size of the MTC data and a threshold value when the MTC data arrives at an empty transmission buffer, and if so, transmits the BSR to the cellular station via the wireless module.

In another aspect of the invention, a buffer status reporting method for machine type communication (MTC) data for a mobile communications device with a wireless module is provided. The buffer status reporting method may include the steps of receiving MTC data, and determining whether to trigger a buffer status report (BSR) according to a comparison result of the data size of the MTC data and a threshold value when the MTC data arrives at an empty transmission buffer, and transmitting the BSR to the cellular station via the wireless module when determining to trigger BSR.

Other aspects and features of the invention will become apparent to those with ordinary skill in the art upon review of the following descriptions of specific embodiments of the mobile communications devices and the buffer status reporting methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

As described above, in current LTE wireless communication systems, if current BSR triggering scheme is applied, each time a new uplink (UL) data (e.g. MTC data) has received and the transmission buffer is empty (i.e. there is no data available for transmission), the mobile communications device will trigger a regular BSR to be transmitted to the cellular station of the service network immediately. The invention considers that MTC data are typically transmitted by a way of small size data and are frequently transmitted, and thus a large amount of regular BSR may be triggered, during the transmission of the MTC data, especially for those data which need to be transmitted periodically. This may bring an increase in the signaling overhead and decrease the system overall performance. As most MTC applications are delay tolerant, the invention provides an improved buffer status reporting procedure which may first collect MTC data when the collect MTC data arrives at the transmit buffer and the transmission buffer is empty, accumulate the MTC data until the data size for data stored in the transmission buffer is greater than a predetermined data size requirement and trigger a regular BSR only when the data size for data stored in the transmission buffer is greater than the predetermined data size requirement, thereby significantly reducing the number of triggered regular BSR and improving the overall system performance.

Figure 1:
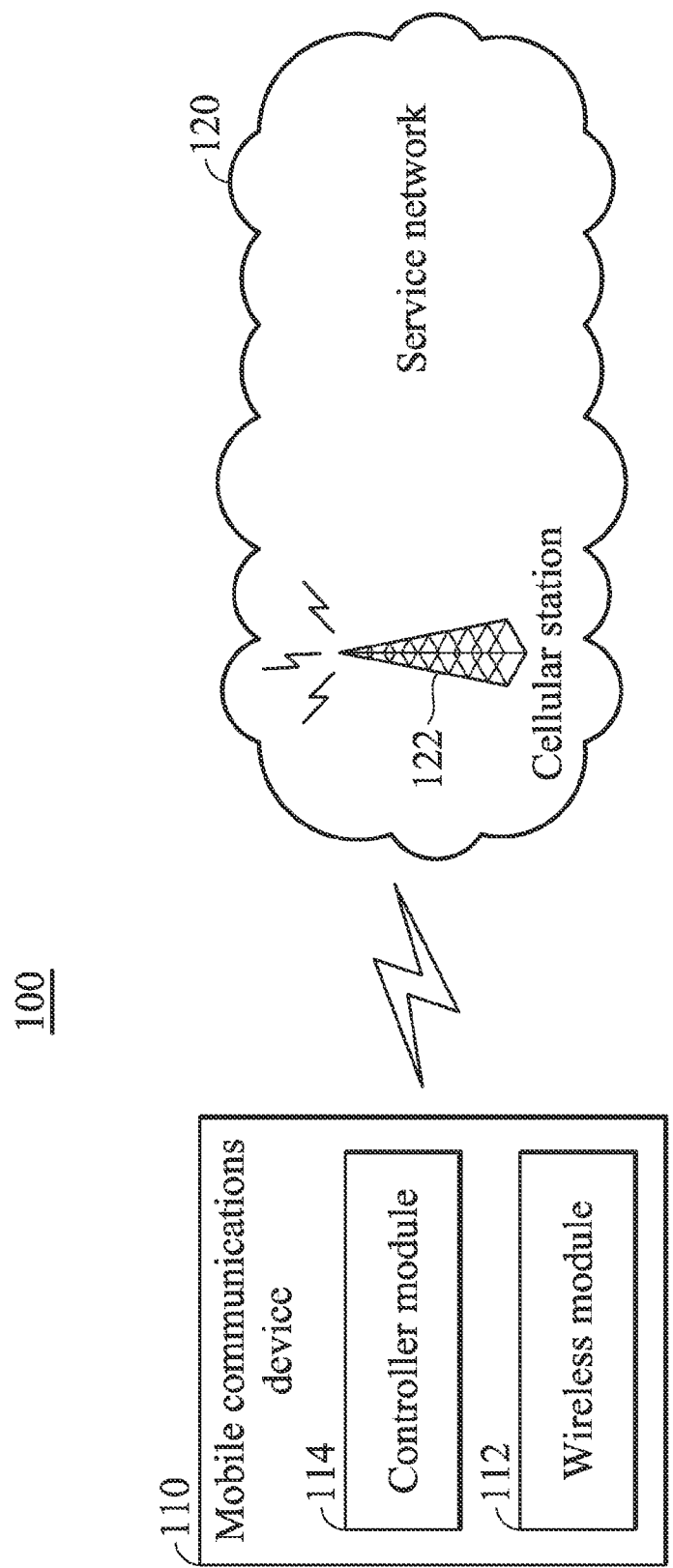
FIG. 1 is a block diagram illustrating a mobile communications system according to an embodiment of the invention.

FIG. 1 is a block diagram illustrating a mobile communications system according to an embodiment of the invention. In the mobile communications system 100, the mobile communications device 110 is wirelessly connected to the cellular station 122 of the service network 120 for obtaining wireless services. Generally, the mobile communications device 110 may be referred to as a User Equipment (UE) and the cellular station 122 may be referred to as a base station, an access station or an evolved Node B (eNB). In this embodiment, the mobile communication device 110 may a MTC capable device which is a device supporting MTC and can be used for performing machine to machine (M2M) communications with other MTC capable devices or systems. The mobile communication device 110 comprises a wireless module 112 for performing the functionality of wireless transmissions and receptions to and from the cellular station 122. To further clarify, the wireless module 112 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 further comprises a controller module 114 for controlling the operation of the wireless module 112 and other functional components, such as a display unit and/or keypad serving as the MMI (man-machine interface), a storage unit storing the program codes of applications or communication protocols, or others. The service network 120 may also comprise a control node for controlling the operation of the at least one access node. The operation of the service network 120 is in compliance with a communication protocol. In one embodiment, the service network 120 may be an LTE network and the mobile communications device 110 may be a UE in compliance with one of the specifications of the LTE communication protocols, and the invention is not limited thereto. In addition, the mobile communication device 110 may further comprise a transmission buffer (not shown) for storing data to be transmitted, which is received from the upper layers. The transmission buffer is referred to as being empty if there is no data available for transmission therein and is referred to as not being empty if there is any data available for transmission therein.

To be more specific, the controller module 114 controls the wireless module 112 for performing a regular buffer status reporting procedure with the service network 120. Generally, the BSR may be one of the MAC control elements, which is included in a MAC protocol data unit (PDU).

Figure 2:
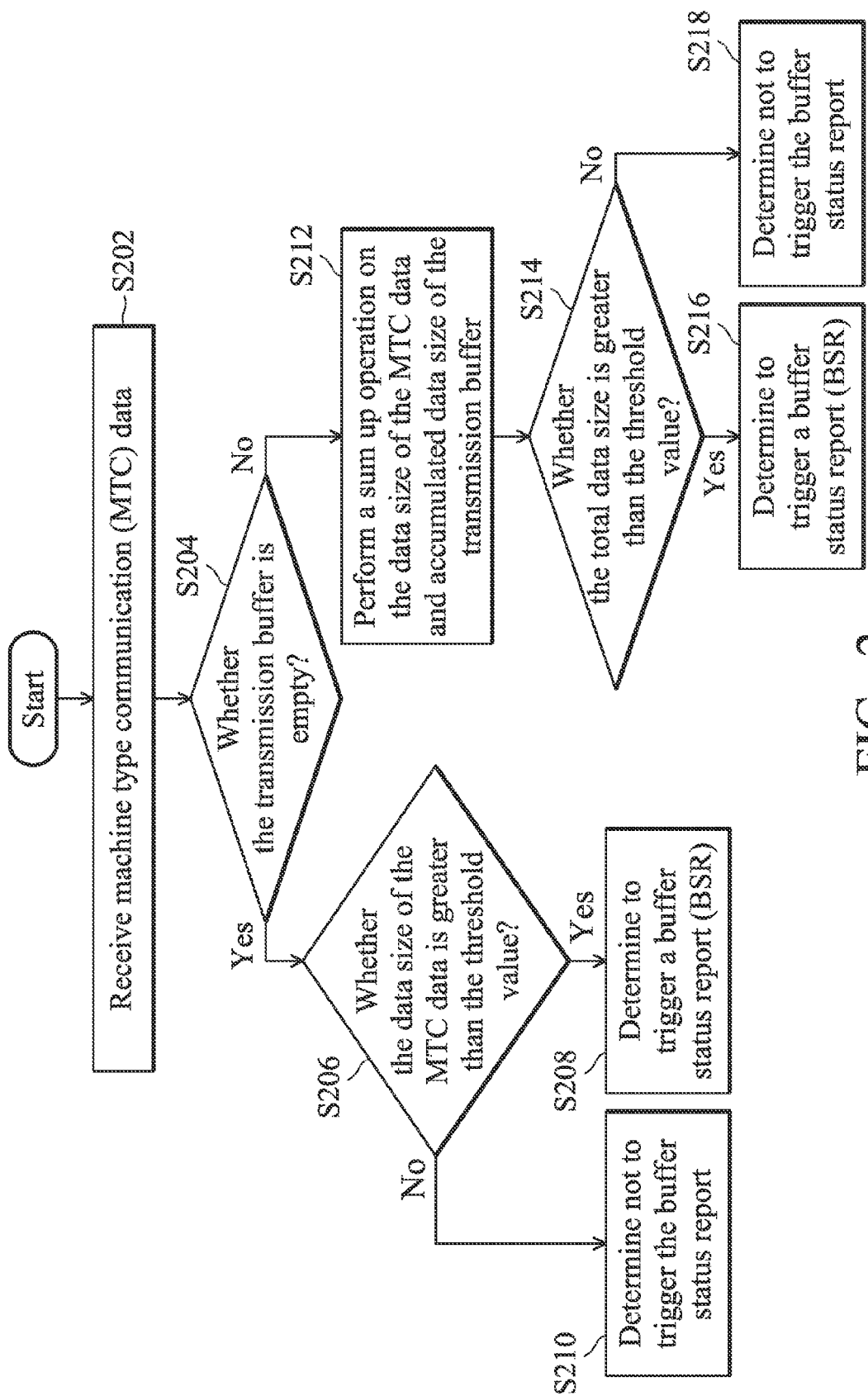
FIG. 2 is a flow chart illustrating a buffer status reporting method for MTC data according to an embodiment of the invention.

FIG. 2 is a flow chart illustrating a buffer status reporting method for MTC data according to an embodiment of the invention. In this embodiment, the buffer status reporting method for MTC data may be applied in the mobile communications device 110 as shown in FIG. 1, wherein the wireless module 122 is used for performing the functionality of wireless transmissions and receptions to and from the cellular station 122.

First, in step S202, the controller module 114 receives MTC data from upper layers and transmits the received MTC data to a transmission buffer of the MAC layer to prepare for transmission. Thereafter, the controller module 114 determines that whether the transmission buffer is empty when the MTC data arrives at the transmission buffer. As aforementioned, determining whether the transmission buffer is empty may be performed by determining whether there is any data available for transmission in the transmission buffer before the MTC data is arrived at the transmission buffer. The transmission buffer is referred to as is empty if there is no data available for transmission therein while it is referred to as not is empty if there is any data available for transmission therein. Meanwhile, if the transmission buffer is empty (Yes in step S204), the controller module 114 further performs steps S206-S210 to determine whether to trigger a BSR according to a comparison result of the data size of the MTC data and a threshold value. The threshold value may be configured as, for example, a predetermined ratio of the buffer size of the transmission buffer, e.g. be configured as 60%, 70% or 80% of the buffer size of the transmission buffer, and the invention is not limited thereto. For example, if the buffer size of the transmission buffer is set to be 100 data units (e.g. bytes) and the threshold value is configured as 60% of the buffer size of the transmission buffer, the threshold value is set to be 60 data units.

In step S206, the controller module 114 further determines whether the data size of the MTC data is greater than the threshold value. For example, in above example, the determination of whether the data size of the MTC data is greater than the threshold value may be performed by determining whether the data size of the MTC data is greater than 60 data units. When the data size of the MTC data to be transmitted is greater than the threshold value (Yes in step S206), in step S208, which represents that the transmission buffer reaches its upper limit of data stored therein and thus no more data can be stored, the controller module 114 determines to trigger a BSR. Therefore, the controller module 114 transmits a BSR to the cellular station 122 via the wireless module 112. It is to be understood that, the BSR is a regular BSR in this embodiment. Contrarily, when the data size of the MTC data to be transmitted is less than or equal to the threshold value (No in step S206), in step S210, which represents that there is still a room for storing data in the transmission buffer, the controller module 114 thus determines not to trigger the BSR, and also calculates a accumulated data size of the data size of the MTC data and accumulated data size of all data in the transmission buffer for use in subsequent determination. In this embodiment, as the transmission buffer is empty, the accumulated data size is the same as the data size of the MTC data.

Subsequent to S204, if the transmission buffer is not empty (No in step S204), which represents that some data has already stored in the transmission buffer, in step S212, the controller module 114 performs a sum up operation on the data size of the MTC data and an accumulated data size of the transmission buffer and then performs steps S214-S218 to determine whether to trigger the BSR according to a comparison result of the data size of the MTC data and an accumulated data size of the transmission buffer and the threshold value. The controller module 114 may compare a total data size of the data size of the MTC data and the accumulated data size of the transmission buffer with the threshold value, and triggers the BSR based on a comparison result of whether the total data size is greater than the threshold value. Accordingly, in step S214, the controller module 114 determines whether the total data size of the data size of the MTC data and the accumulated data size of the transmission buffer is greater than the threshold value. When the total data size of the data size of the MTC data and the accumulated data size of the transmission buffer is greater than the threshold value (Yes in step S214), in step S216, which represents that the transmission buffer reaches its upper limit of data stored therein and thus no more data can be stored, the controller module 114 triggers the BSR. Contrarily, when the total data size of the data size of the MTC data and the accumulated data size of the transmission buffer is less than or equal to the threshold value (No in step S214), in step S218, which represents that there is still a room for storing data in the transmission buffer, the controller module 114 thus determines not to trigger the BSR. In one embodiment, the value of the threshold value may be directly configured by the mobile communications device 110 using an upper layer signaling. In another embodiment, the value of the threshold value may be configured by the cellular station 122. In this embodiment, the controller module 114 may first receive a first message from the cellular station 122 via the wireless module 112 prior to the triggering of the BSR and then obtains the value of the threshold value from the first message.

In addition, to avoid excessive time delay due to improper threshold value, in some embodiments, the controller module 114 may further use a timer to count the number of times the received data is not is transmitted, starts the timer upon determining that the data size of the MTC data is less than or equal to the threshold value, and directs the timer to start a count continually, e.g. continually count down to zero or count from zero to a specific value, at each time the new data has arrived an non-empty transmission buffer and the total data size of the data size of the MTC data and the accumulated data size of the transmission buffer is less than or equal to the threshold value. Thereafter, the controller module 114 may determine whether to trigger the BSR according to a determination of whether the timer has expired. Note that the count value of the timer may be directly configured by the mobile communications device 110 using an upper layer signaling or be configured by the cellular station 122. The step of determining whether to trigger the BSR may only be performed when the timer has expired. Otherwise, i.e. the timer has not expired yet, the controller module 114 may determine not to trigger the BSR. For example, if the timer is of a count-down type, the timer is determined as is expired when the count value of the timer is zero. Reference to the LTE specifications for a detailed description regarding the operations subsequent to performing the trigger of the BSR may be made, and is omitted herein as it is beyond the scope of the invention.

Figure 3A:
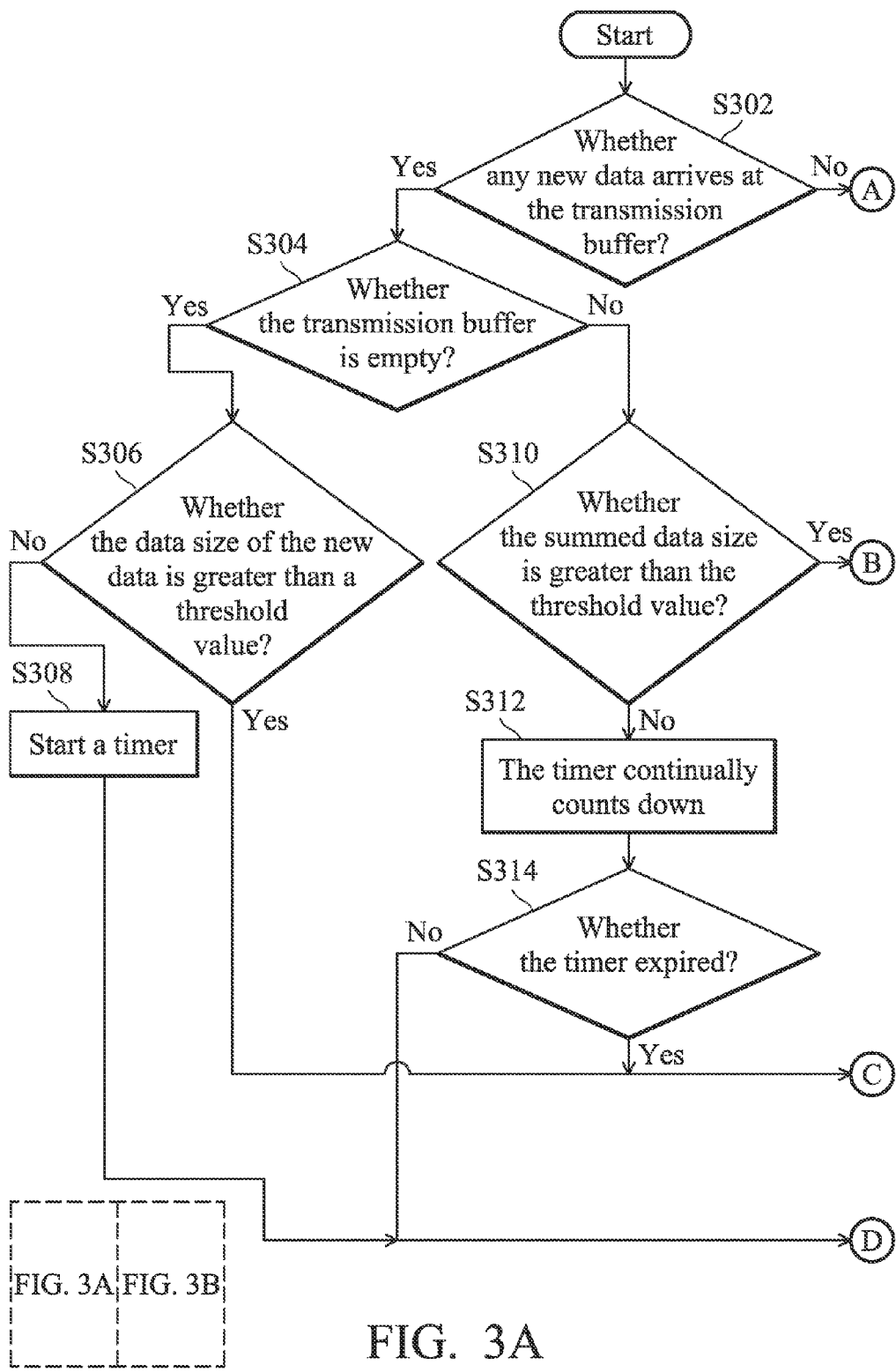
FIGS. 3A and 3B are flow charts illustrating a buffer status reporting method for MTC data according to another embodiment of the invention.
Figure 3B:
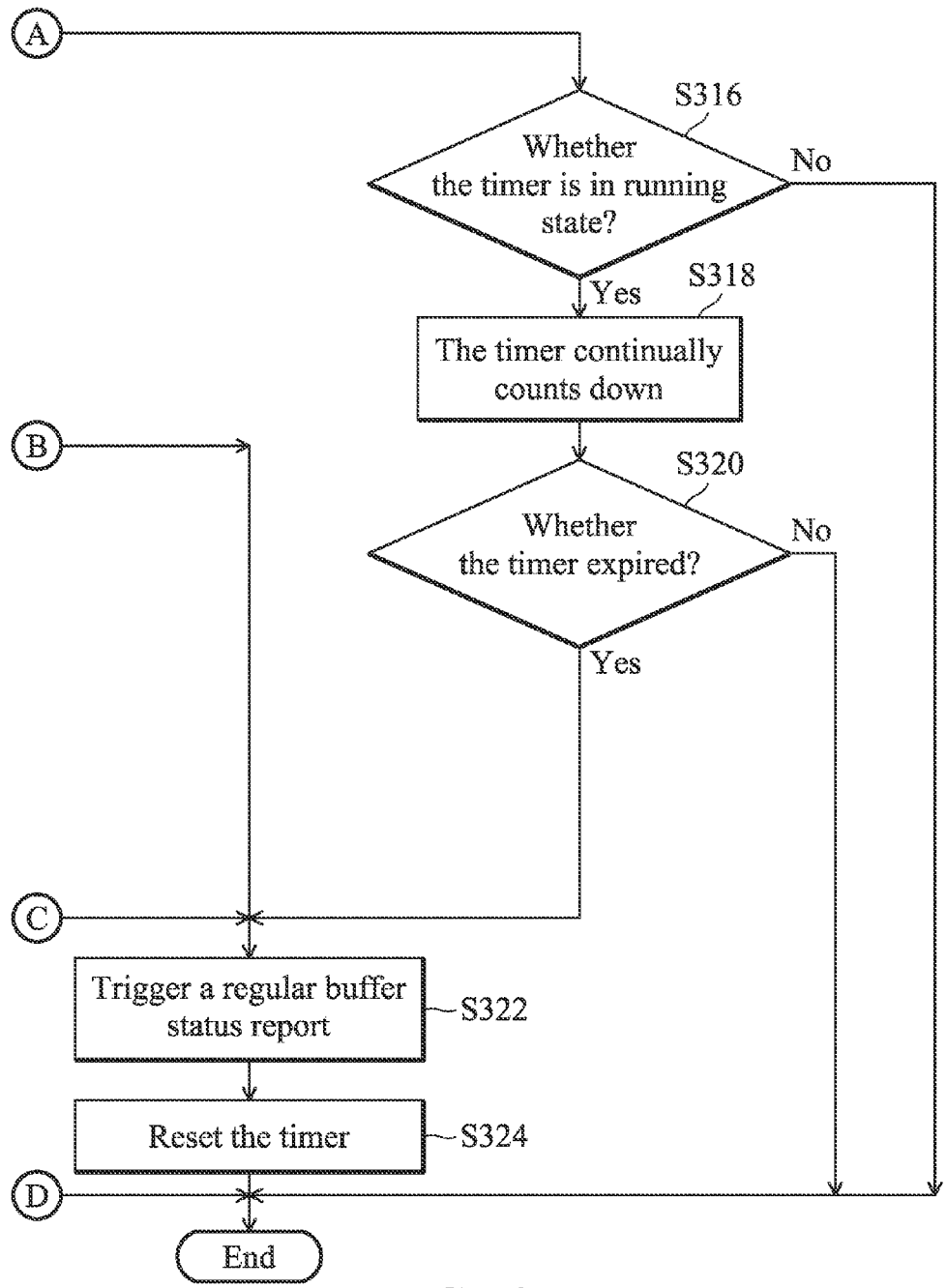

FIGS. 3A and 3B are flow charts illustrating a buffer status reporting method for MTC data according to another embodiment of the invention. In this embodiment, the buffer status reporting method for MTC data may be applied in the mobile communications device 110 as shown in FIG. 1, wherein the wireless module 122 is used for performing the functionality of wireless transmissions and receptions to and from the cellular station 122. Moreover, the controller module 114 may further use a timer which is of a count-down type for counting. It is to be noted that, in this embodiment, the buffer status reporting method should be performed at every transmission time interval (TTI). For explanation, only operation of one specific TTI is illustrated in the following to explain the detailed operation of a buffer status reporting method of the invention, and those skilled in the art will understand that the invention is not limited thereto.

First, the controller module 114 checks, at each TTI, whether any new data, such as MTC data, has arrived at the transmission buffer (step S302). Similarly, when a new data is received by upper layers and is then transmitted to the transmission buffer of the MAC layer to prepare for transmission, the controller module 114 detects that new data has arrived at the transmission buffer. If any new data which is arrived at the transmission buffer has been detected by the controller module 114 at a specific TTI, determination steps S304 to S314 are further performed to determine whether to trigger a BSR. Contrarily, if no new data which is arrived at the transmission buffer can be detected by the controller module 114 at the specific TTI, determination steps S316 to S320 are further performed to determine whether to trigger the BSR.

When detecting that a new data has arrived at the transmission buffer (Yes in step S302), which represents that there is data to be transmitted, the controller module 114 further determines that whether the transmission buffer is empty (step S304). To be more specific, determining whether the transmission buffer is empty may be performed by determining whether there is any new data available for transmission in the transmission buffer before the new data arrives at the transmission buffer. The transmission buffer is determined as is empty if there is no data available for transmission therein while it is determined as not is empty if there is any data available for transmission therein. Meanwhile, if the transmission buffer is empty (Yes in step S304), which means that it is the first time of data transmission, the controller module 114 further determines whether the data size of the new data is greater than a threshold value (step S306). As previously described, the threshold value may be configured as, for example, a predetermined ratio of the buffer size of the transmission buffer, e.g. be configured as 60% of the buffer size of the transmission buffer. For example, the determination of whether the data size of the new data is greater than the threshold value may be performed by determining whether the data size of the MTC data is greater than 60% of the buffer size of the transmission buffer. When the data size of the new data to be transmitted is greater than the threshold value (Yes in step S306), which represents that the transmission buffer reaches its upper limit of data stored therein and thus no more data can be stored, the controller module 114 further performs triggering steps S322 to S324.

Otherwise, when the data size of the new data to be transmitted is less than or equal to the threshold value (No in step S306), which represents that there is still a room for storing data in the transmission buffer, the controller module 114 thus determines not to trigger the BSR. Also, the controller module 114 calculates and stores a accumulated data size of the data size of the new data and accumulated data size of all data in the transmission buffer, and starts the counting of the count-down type timer (step S308). The flow ends after step S308 has been performed. Similarly, as the transmission buffer is empty in this case, the accumulated data size is the same as the data size of the new data.

Subsequent to S304, if the transmission buffer is not empty (No in step S304), which represents that some data has already stored in the transmission buffer, the controller module 114 performs a sum up operation on the data size of the new data and an accumulated data size of the transmission buffer and then determines whether the summed data size is greater than the threshold value (step S310). If so, which represents that the transmission buffer reaches its upper limit of data stored therein and thus no more data can be stored, the controller module 114 further performs triggering steps S322 to S324 to trigger a BSR. If not (No in step S310), which represents that there is still a room for storing data in the transmission buffer, the controller module 114 thus determines not to trigger the BSR and the timer is continually counted (step S312). After the count of the timer has been performed, the controller module 114 further determines whether the timer has expired (step S314).

In this embodiment, the count value of the timer is counted down by one each time the timer is counted and the determination of whether the timer has expired can be performed by determining whether the counted value of the timer is zero. For example, assume that the count value of the timer is initially set to be 3 and the summed accumulated data size does not exceed the threshold value, the controller module 114 directs the count value of the timer to change from 3 to 2 and determines that the timer has not expired. If the summed accumulated data size still does not exceed the threshold value in subsequent two successive TTIs, the controller module 114 directs the timer to start a count down to zero and determines that the timer has expired. Thereafter, the controller module 114 further determines whether to perform the BSR according to the determination result of whether the timer has expired. If so, the controller module 114 triggers the BSR and performs triggering steps S322 to S324; otherwise, if not, determines not to trigger the BSR and the flow ends.

Subsequent to S302, when detecting that no new data has arrived at the transmission buffer at the specific TTI (No in step S302), which represents that there is no new data required to be transmitted at this specific TTI. In this case, however, some data may have been previously stored in the transmission buffer, the controller module 114 further determines whether the timer is in running state (step S316). If it is determined that the timer is not in running state, that is, the timer is not started, the flow ends. Otherwise, if it is determined that the timer is in running state, that is, the timer is started, the controller module 114 directs the timer to start a count down continually (e.g. by directing the timer to count down by one) (step S318), and determines whether the timer has expired (step S320). Thereafter, the controller module 114 further determines whether to trigger the BSR according to the determination result of whether the timer has expired. If so, the controller module 114 triggers the BSR and performs triggering steps S322 to S324; otherwise, if not, determines not to trigger the BSR and the flow ends.

In the aforementioned steps, if the data size of the new data or the accumulated data size of the transmission buffer is greater than the threshold value or the timer has expired, the controller module 114 determines to trigger a BSR and thus transmits the BSR to the cellular station 122 via the wireless module 112 (step S322). It is to be understood that, the BSR is a regular BSR in this embodiment. After the BSR has been triggered, the controller module 114 may further reset the timer for use in subsequent determination of whether to trigger a BSR. In some embodiments, after the BSR has been triggered, the controller module 114 may further trigger a Scheduling Request (SR) procedure to be transmitted to the cellular station 122 to request the cellular station 122 to allocate resources for transmission so as to transmit data using allocated resources. Reference to the LTE specifications for a detailed description regarding the SR procedure may be made, and is omitted herein as it is beyond the scope of the invention.

Similarly, the value of the threshold value and the count value of the timer may be directly configured by the mobile communications device 110 using an upper layer signaling or be configured by the cellular station 122. In one embodiment, the controller module 114 may first receive a first message from the cellular station 122 via the wireless module 112 prior to the triggering of the BSR and then obtain the value of the threshold value and the count value of the timer from the first message. The controller module 114 may further transmit a second message to the cellular station, indicating to the cellular station 122 that a transmission of small size data is being performed via the wireless module 112 prior to the reception of the first message from the cellular station 122. Upon reception of the second message, the cellular station 122 recognizes that the mobile communications device 110 is going to perform a transmission of small size data, so determines the setting values of the threshold value and the timer based on present network statuses and resource arrangements, and then transmits the first message comprising the value of the threshold value and the count value of the timer to the mobile communications device 110. Specially, when a transmission of small size data (e.g. a transmission of MTC data which includes only few bytes) is to be performed, the mobile communications device 110 may transmit a connection request message (the second message) to the service network 120, wherein the second message at least includes information for indicating to the cellular station 122 that a transmission of small size data is being performed. The cellular station 122 in the service network 120 then determines the setting values of the threshold value and the timer based on present network statuses and resource arrangements, generates a response message (the first message) corresponding to the connection request message and comprising the setting values of the threshold value and the timer, and then transmits the response message to the mobile communications device 110 so as to feed back the setting value of the threshold value and the count value of the timer to the mobile communications device 110 for configuration.

Therefore, according to the buffer status reporting methods for MTC data and related mobile communications devices of the invention, by properly selecting the threshold value, the mobile communications device can send large amount of small size MTC data at one transmission without affecting the system performance to efficiently avoid signaling and network resource overheads caused by frequently triggering the BSR to request for resource arrangement during performing the MTC transmission, thereby saving power of the mobile communications device and significantly reducing occupied network resources. Moreover, the buffer status reporting methods of the invention may further apply the threshold value and the timer to avoid excessive time delay for MTC data transmission.

The methods may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 114 in FIG. 1, the program code may perform the buffer status reporting method for MTC in a mobile communications device. In addition, the method may be applied to any MTC capable mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communications device for performing a buffer status reporting procedure, comprising:
   a wireless module, performing wireless transmissions and receptions to and from a cellular station of a service network; and
   a controller module, receiving machine type communication (MTC) data, and determining whether to trigger a buffer status report (BSR) to the cellular station via the wireless module according to a comparison result of the data size of the MTC data and a threshold value when the MTC data arrives at an empty transmission buffer of the mobile communications device,
   wherein the controller module further determines whether to trigger the BSR according to a comparison result of the data size of the MTC data and an accumulated data size of the transmission buffer and the threshold value when the MTC data arrives at an empty transmission buffer of the mobile communications device, wherein the controller module triggers the BSR when a total amount of the data size of the MTC data and the accumulated data size of the transmission buffer is greater than the threshold value and the controller module further starts a timer when the data size of the MTC data is less than or equal to the threshold value, directs the timer to start a count when the total amount of the data size of the MTC data and the accumulated data size of the transmission buffer is less than or equal to the threshold value, and triggers the BSR when the count of the timer has expired.

2. The mobile communications device of claim 1, wherein the controller module determines not to trigger the BSR when the data size of the MTC data is less than or equal to the threshold value, and determines to trigger the BSR when the data size of the MTC data is greater than the threshold value.

3. The mobile communications device of claim 1, wherein the controller module further triggers the BSR when the count of the timer is expired.

4. The mobile communications device of claim 3, wherein the controller module further resets the timer after the BSR has been triggered.

5. The mobile communications device of claim 1, wherein the value of the threshold value and the count value of the timer are configured by an upper layer signaling of the mobile communications device.

6. The mobile communications device of claim 1, wherein the controller module further receives a first message from the cellular station via the wireless module, prior to the triggering of the BSR and obtains the value of the threshold value and the count value of the timer from the first message.

7. The mobile communications device of claim 6, wherein the controller module further transmits a second message to the cellular station, indicating to the cellular station that a transmission of small size data is being performed via the wireless module, prior to the reception of the first message from the cellular station, such that the cellular station transmits the first message comprising the value of the threshold value and the count value of the timer.

8. The mobile communications device of claim 1, wherein the threshold value is configured as a predetermined ratio of the buffer size of the transmission buffer.

9. A buffer status reporting method for machine type communication (MTC) data for a mobile communications device with a wireless module, comprising:
   receiving MTC data; and
   determining whether to trigger a buffer status report (BSR) according to a comparison result of the data size of the MTC data and a threshold value when the MTC data arrives at an empty transmission buffer, and transmitting the BSR to the cellular station via the wireless module when determining to trigger the BSR,
   wherein the method further comprises:
   determining whether to trigger the BSR according to a comparison result of the data size of the MTC data and an accumulated data size of the transmission buffer and the threshold value when the MTC data arrives at an empty transmission buffer of the mobile communications device, wherein the BSR is triggered when a total amount of the data size of the MTC data and the accumulated data size of the transmission buffer is greater than the threshold value;
   starting a timer when the data size of the MTC data is less than or equal to the threshold value;
   directing the timer to count when the total amount of the data size of the MTC data and the accumulated data size of the transmission buffer is less than or equal to the threshold value; and
   determining whether to trigger the BSR according to a determination of whether the count of the timer has expired.

10. The buffer status reporting method of claim 9, wherein the step of determining whether to trigger the BSR further comprises:
    determining not to trigger the BSR when the data size of the MTC data is less than or equal to the threshold value; and
    determining to trigger the BSR when the data size of the MTC data is greater than the threshold value.

11. The buffer status reporting method of claim 9, wherein the step of determining whether to trigger the BSR according to the determination of whether the count of the timer has expired further comprises:
    determining to trigger the BSR when the count of the timer is expired.

12. The buffer status reporting method of claim 11, further comprising:
    resetting the timer after the BSR has been triggered.

13. The buffer status reporting method of claim 9, wherein the value of the threshold value and the count value of the timer are configured by an upper layer signaling of the mobile communications device.

14. The buffer status reporting method of claim 9, further comprising:
    receiving a first message from the cellular station via the wireless module, prior to the triggering of the BSR and obtaining the value of the threshold value and the count value of the timer from the first message.

15. The buffer status reporting method of claim 14, further comprising:
    transmitting a second message to the cellular station, indicating to the cellular station that a transmission of small size data is being performed via the wireless module, prior to the reception of the first message from the cellular station, such that the cellular station transmits the first message comprising the value of the threshold value and the count value of the timer.

16. The buffer status reporting method of claim 9, wherein the threshold value is configured as a predetermined ratio of the buffer size of the transmission buffer.

17. The buffer status reporting method of claim 9, wherein the BSR is a regular BSR.

18. The buffer status reporting method of claim 9, further comprising:
   triggering a scheduling request (SR) procedure after the BSR has been triggered.

* * * * *